(12) United States Patent
Chen et al.

(10) Patent No.: US 11,301,300 B2
(45) Date of Patent: Apr. 12, 2022

(54) METHOD FOR RESOURCE ALLOCATION AND TERMINAL DEVICE

(71) Applicant: GUANGDONG OPPO MOBILE TELECOMMUNICATIONS CORP., LTD., Guangdong (CN)

(72) Inventors: Yan Chen, Guangdong (CN); Jie Cheng, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 49 days.

(21) Appl. No.: 16/880,466

(22) Filed: May 21, 2020

(65) Prior Publication Data

US 2020/0285515 A1 Sep. 10, 2020

Related U.S. Application Data

(63) Continuation of application No. 16/117,112, filed on Aug. 30, 2018, now Pat. No. 10,698,736.

(30) Foreign Application Priority Data

Aug. 31, 2017 (CN) .......................... 201710774805.5

(51) Int. Cl.
*G06F 9/50* (2006.01)
*G06F 11/30* (2006.01)
*G06F 11/34* (2006.01)

(52) U.S. Cl.
CPC ............ *G06F 9/505* (2013.01); *G06F 9/5011* (2013.01); *G06F 9/5055* (2013.01);
(Continued)

(58) Field of Classification Search
CPC ....................................................... G06F 9/505
See application file for complete search history.

(56) References Cited

U.S. PATENT DOCUMENTS

2005/0188088 A1   8/2005   Fellenstein et al.
2006/0248142 A1  11/2006   Ishizaki et al.
(Continued)

FOREIGN PATENT DOCUMENTS

CN   102073504 A   5/2011
CN   102377730 A   3/2012
(Continued)

OTHER PUBLICATIONS

Communication pursuant to Article 94(3) EPC issued in corresponding European application No. 18190677.7 dated Sep. 24, 2020.
(Continued)

*Primary Examiner* — Charlie Sun
(74) *Attorney, Agent, or Firm* — Young Basile Hanlon & MacFarlane, P.C.

(57) ABSTRACT

A method for resource allocation, a terminal device, and a non-transitory computer readable storage medium are provided. The method includes the following. A photography application of a terminal device determines a running scenario. The photography application determines a performance improvement strategy for the running scenario. The photography application sends a scenario data packet to an operating system of the terminal device, where the scenario data packet includes the performance improvement strategy and is configured for the operating system to adjust allocation of system resources for the photography application according to the performance improvement strategy.

18 Claims, 6 Drawing Sheets

(52) U.S. Cl.
CPC .......... *G06F 9/5077* (2013.01); *G06F 11/302* (2013.01); *G06F 11/3409* (2013.01); *G06F 11/3442* (2013.01); *G06F 2209/503* (2013.01); *G06F 2209/5013* (2013.01); *G06F 2209/5022* (2013.01)

(56) References Cited

U.S. PATENT DOCUMENTS

| | | | |
|---|---|---|---|
| 2007/0079313 | A1 | 4/2007 | Sakurai |
| 2009/0276783 | A1* | 11/2009 | Johnson ................ G06F 9/5077 718/104 |
| 2010/0262973 | A1 | 10/2010 | Ernst et al. |
| 2013/0138816 | A1 | 5/2013 | Kuo et al. |
| 2014/0013332 | A1 | 1/2014 | Wei et al. |
| 2015/0365351 | A1 | 12/2015 | Suit |
| 2016/0191627 | A1 | 6/2016 | Huang et al. |
| 2017/0118610 | A1* | 4/2017 | Schieman ........... G06F 11/3466 |

FOREIGN PATENT DOCUMENTS

| | | |
|---|---|---|
| CN | 102780816 A | 11/2012 |
| CN | 103430151 A | 12/2013 |
| CN | 106095592 A | 11/2016 |
| EP | 0346039 A2 | 12/1989 |
| GB | 2404264 A | 1/2005 |
| WO | 2012068150 A1 | 5/2012 |

OTHER PUBLICATIONS

First examination report issued in corresponding IN application No. 201834032034 dated Jul. 24, 2020.
The first OA with English Translation issued in corresponding CN application No. 201710774805.5 dated Apr. 18, 2019.
NOA with English Translation issued in corresponding CN application No. 201710774805.5 dated Jan. 13, 2020.
Non-Final OA issued in corresponding U.S. Appl. No. 16/117,112 dated Oct. 3, 2019.
Summons to attend oral proceedings pursuant to Rule 115(1) EPC for EP Application 18190677.7 mailed May 18, 2021. (11 pages).
International search report issued in corresponding international application No. PCT/CN2018/101354 dated Nov. 12, 2018.
Extended European search report issued in corresponding European application No. 18190677.7 dated Jan. 29, 2019.
A Basic Guide to Photoshop Filters; Saad Sadiq; Sep. 6, 2010; 2 pages.
Decision to refuse for EP Application 18190677.7 dated Nov. 25, 2021. (10 pages).

* cited by examiner

Android system

METHOD FOR RESOURCE ALLOCATION AND TERMINAL DEVICE

CROSS-REFERENCE TO RELATED APPLICATION(S)

This application is a continuation of U.S. patent application Ser. No. 16/117,112, filed on Aug. 30, 2018, which claims priority to Chinese Patent Application No. 201710774805.5, filed on Aug. 31, 2017, the content of both of which are hereby incorporated by reference in their entireties.

TECHNICAL FIELD

This disclosure relates to the technical field of terminal devices, and particularly to a method for resource allocation, a terminal device, and a non-transitory computer readable storage medium.

BACKGROUND

With the rapid development of technologies relating to terminal devices, an increasing number of applications are installed in mobile phones of users, such as reading applications, payment applications, game applications, music applications, and the like. People's daily life is closely linked with the mobile phones.

At present, a user has high demands on performance of various applications, such as the speed of applications, the sharpness of screen of applications, and the like. Meanwhile, applications also have increasing demands on mobile phones.

SUMMARY

According to a first aspect of the disclosure, a method for resource allocation is provided. The method includes the follows. A photography application of a terminal device determines a running scenario. The photography application determines a performance improvement strategy for the running scenario. The photography application sends a scenario data packet to an operating system of the terminal device, where the scenario data packet includes the performance improvement strategy and is configured for the operating system to adjust allocation of system resources for the photography application according to the performance improvement strategy.

According to a second aspect of the disclosure, a terminal device is provided. The terminal device includes at least one processor and a computer readable storage, coupled to the at least one processor and storing at least one computer executable instruction thereon which, when executed by the at least one processor, cause the at least one processor to: determine, with a photography application of the terminal device, a running scenario; determine, with the photography application, a performance improvement strategy for the running scenario; send, with the photography application, a scenario data packet to an operating system of the terminal device, wherein the scenario data packet comprises the performance improvement strategy and is configured for the operating system to adjust allocation of system resources for the photography application according to the performance improvement strategy.

According to a third aspect of the disclosure, a non-transitory computer readable storage medium is provided. The non-transitory computer readable storage medium is configured to store computer programs which, when executed by a processor, are operable with the processor to: determine, with a photography application of a terminal device, a running scenario; determine, with the photography application, a performance improvement strategy for the running scenario; send, with the photography application, a scenario data packet to an operating system of the terminal device, wherein the scenario data packet comprises the performance improvement strategy and is configured for the operating system to adjust allocation of system resources for the photography application according to the performance improvement strategy.

BRIEF DESCRIPTION OF THE DRAWINGS

The following briefly introduces the accompanying drawings required for describing the implementations.

DETAILED DESCRIPTION

In order to enable those skilled in the art to better understand solutions of the present disclosure, technical solutions in implementations of the present disclosure will be described clearly and completely hereinafter with reference to the accompanying drawings in the implementations of the present disclosure. Apparently, the described implementations are merely some rather than all implementations of the present disclosure. All other implementations obtained by those of ordinary skill in the art based on the implementations of the present disclosure without creative efforts shall fall within the protection scope of the present disclosure.

The terms "first", "second", and the like used in the specification, the claims, and the accompany drawings of the present disclosure are used to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or device can be included either.

The term "embodiment" or "implementation" referred to herein means that a particular feature, structure, or feature described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is expressly and implicitly understood by those skilled in the art that an implementation described herein may be combined with other implementations.

The terminal device involved in the implementations of the present disclosure may include various handheld devices, in-vehicle devices, wearable devices, computing devices that have wireless communication functions or other processing devices connected to the wireless scenario, as well as various forms of user equipments (UE), mobile stations (MS), terminal devices, and the like. For the convenience of description, the above-mentioned devices are collectively referred to as a terminal device. An operating system related to the implementations of the disclosure is a software system that manages hardware resources uniformly and provides a user with a service interface.

Figure 1A:
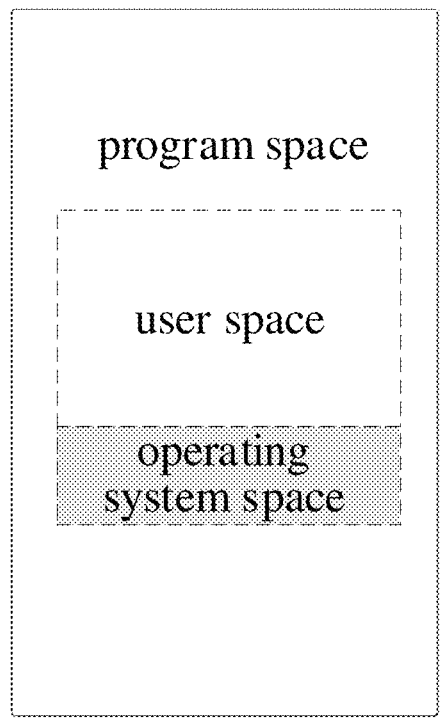
FIG. 1A is a schematic diagram illustrating a system architecture of a program space.
Figure 1B:
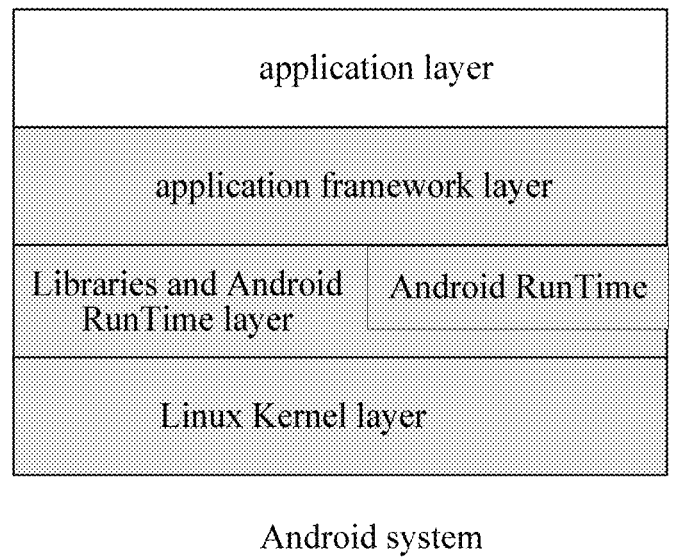
FIG. 1B is a schematic diagram illustrating a system architecture of an Android system.

As illustrated in FIG. 1A, a terminal device such as a smart phone generally has a program space for running programs. The program space includes a user space and an operating system space (that is, a place to install the operating system). One or more applications, which are third-party applications installed on the terminal device, can run in the user space. An operating system of the terminal device runs in the operating system space. Examples of the operating system include but are not limited to an Android® system, a mobile operating system iOS® developed by Apple®, etc. As illustrated in FIG. 1B, the following describes the Android system runs on the terminal device as an example. In the case of Android system, the user space includes an application layer of the Android system and the operating system space includes an application framework layer, Libraries and Android RunTime layer, and Linux Kernel layer of the Android system. The application layer includes various applications directly interacting with a user, or service programs written in the Java language and running in the background, for example, programs for implementing common basic functions on smart phones, such as short messaging service (SMS), telephone dialing, picture viewers, calendars, games, maps, world wide web (Web) browsers, etc., as well as other applications developed by developers. The application framework layer provides a series of libraries required in developing Android applications, which can be used to reuse components as well as personalize extensions through inheritance. The Libraries and Android RunTime layer can support the application framework and provides services for various components in the Android system. The Libraries and Android RunTime layer consist of Libraries and Android RunTime. The Android RunTime includes a core library and a Dalvik virtual machine. The Linux kernel layer is configured to implement core functions such as hardware device driving, process and memory management, network protocol stacks, power management, wireless communication, and the like.

The process created by the above-mentioned third-party application runs in the user space at first. When it needs to perform operations such as sending network data, reading disk resources, and the like, standard interface functions provided by the operating system such as "write" and "send" should be invoked. That is, a CPU invokes codes of the operating system space to achieve request operations of the user. It can be seen that a third-party application can only invoke the standard interface functions provided by the operating system to achieve functions of the operating system. Moreover, the operating system has no idea about what functions the third-party application is executing, and an application such as a photography application cannot command the operating system to perform specific operations. The operating system is independent from the photography application. Consequently, the operating system cannot distinguish an internal running scenario of the photography application and can only use one set of standard parameters for adapting, as a result, targeted performance optimization of the internal running scenario of the photography application cannot be achieved. In some implementations, when the operating system detects the photography application that is currently running, central processing unit (CPU) resources, graphic processing unit (GPU) resources, memory bandwidth resources, and other system resources are adjusted to the highest state, to improve user experience. However, as the CPU, the GPU, the memory bandwidth, and the like have been operating in a higher state or even the highest state, higher power and electric quantity are consumed.

In view of the above, implementations of the disclosure provide a method for resource allocation of a photography application of a terminal device. According to the method, an operating system receives a scenario data packet of the photography application that is currently running, where the scenario data packet includes a performance improvement strategy determined or generated by the photography application according to a running scenario. Then the operating system acquires the performance improvement strategy by analyzing the scenario data packet and adjusts allocation of system resources for the photography application according to the performance improvement strategy. With aid of the method, it is possible for the operating system to optimize performance of the photography application under running. A processing speed of the operating system of the terminal device can be improved and real-time performance of resource optimization of the photography application, which is conducted under control of the terminal device, can be improved.

The following describes the implementations of the disclosure in conjunction with the accompanying drawings.

Figure 2:
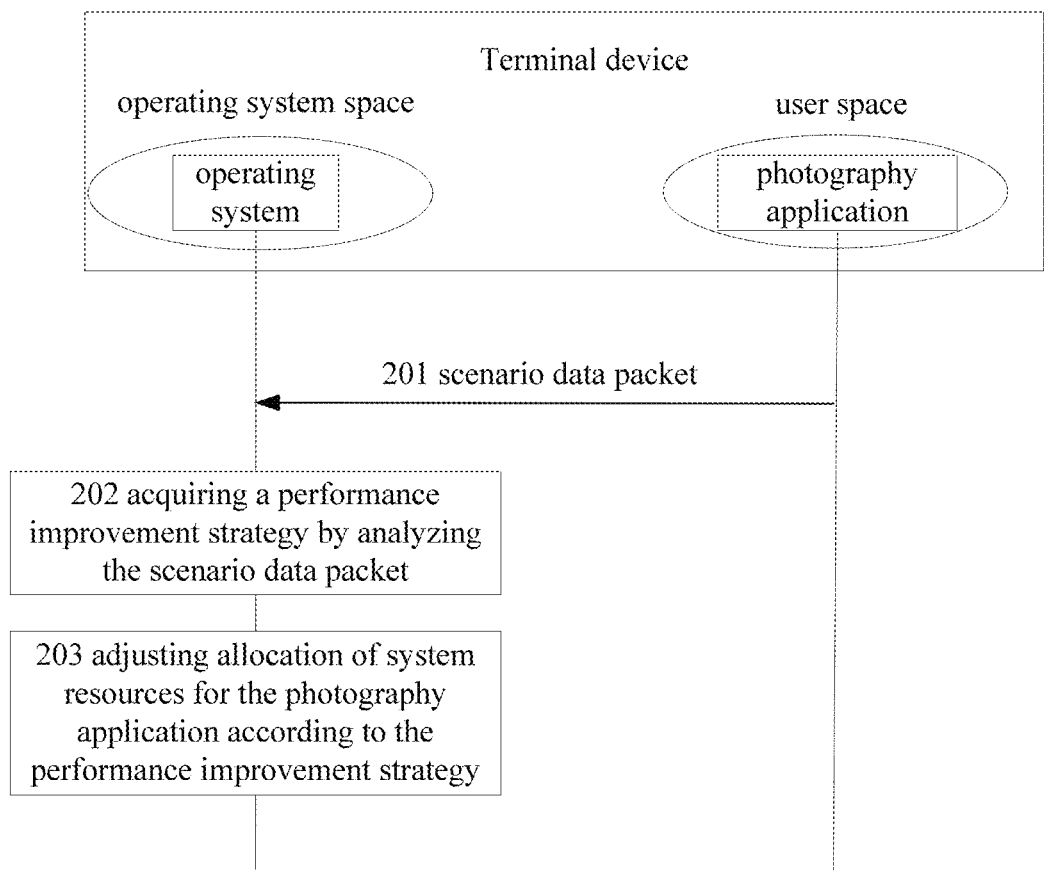
FIG. 2 is a schematic flow chart illustrating a method for resource allocation according to an implementation of the present disclosure.

FIG. 2 is a schematic flow chart illustrating a method for resource allocation according to an implementation of the present disclosure. The method can be applicable to a terminal device with an operating system and at least one application for example. The at least one application includes a photography application for capturing images and/or recording videos via a camera. In this method, the operating system receives a scenario data packet of a photography application that is currently running, analyzes the scenario data packet to acquire the performance improvement strategy, and then adjusts allocation of system resources for the photography application according to the performance improvement strategy. As illustrated in FIG. 2, the method begins at block 201.

At block 201, the operating system receives a scenario data packet of a photography application that is currently running, where the scenario data packet includes a performance improvement strategy determined by the photography application according to a running scenario (also known as running mode).

The photography application refers to a third-party application installed in a user space of the terminal device. The third-party application may be installed by a user or pre-installed by developers before the terminal device leaves the factory. The disclosure is not particularly restricted.

The running scenario includes at least includes one of a shooting preview scenario, a shooting scenario, a continuous shooting scenario, and a filter scenario. The terms "scenario" and "mode" can be replaced with each other without conflict.

The running scenario refers to a current running scenario of the photography application. The running scenario may be classified according to different preset conditions, for example, it may be classified into a shooting preview scenario, a shooting scenario, a continuous shooting scenario, a filter scenario, and the like according to the demand for central processing unit (CPU) resources, or classified into a viewing picture scenario, a viewing video scenario, and the like according to the demand for graphic processing unit (GPU) resources. Different running scenarios are classified or divided according to different demands for system resources, helping to quickly determine the performance improvement strategy according to the running scenario. In addition, the preset conditions may be associated with different photography applications, and different photography applications may provide the same or different running scenarios according to the preset conditions. The disclosure will not be particularly restricted.

The performance improvement strategy is a strategy determined by the photography application according to the current running scenario, and the performance improvement strategy for the running scenario is configured to improve running performance of the current running scenario. The performance improvement strategy may include system resources to-be-adjusted, and an adjustment amount of the system resources to-be-adjusted, or an adjustment duration of the system resources to-be-adjusted. In addition, formats of the scenario data packet may be, for example, a JavaScript object notation (JSON), a protocol buffer (Protobuf), a custom format, or other data transmission formats. The disclosure is not limited herein.

For transmission of the scenario data packet between the photograph application and the operating system, data transmission medium may be required. In this regard, in one possible implementation, the method further includes the follows prior to the operating system receiving the scenario data packet of the photography application that is currently running at block 201.

The operating system receives a connection request from the photography application, where the connection request contains an application identifier of the photography application. The operating system queries an authority list for the at least one application by using the application identifier as a query identifier. The operating system allocates a data transmission interface for the photography application, when the application identifier of the photography application is contained in the authority list. The data transmission interface is configured for data transmission between the photography application and the operating system, and the data transmitted at least includes the scenario data packet.

The authority list is a preset authority list in the operating system. The authority list is pre-stored in the operating system by the manufacturer and can be updated by updating the operating system. Moreover, the authority list contains application identifiers of a plurality of applications that allow inter-process communication with the operating system.

After allocating the data transmission interface for the photography application, the operating system can communicate with the photography application via Socket port communication transmission, pipe communication, shared memory, shared files, and the like. The disclosure is not limited thereto.

The data transmission interface is configured to provide an effective data transmission link between the photography application and the operating system when the photography application is running. After the photography application stops running, the data transmission link will be cleared, and the data transmission interface will be disabled.

In this implementation, when receiving the connection request from the photography application, instead of blindly allocating the data transmission interface for any application, the operating system, the operating system first determines an authority of the photography application, and then allocates the data transmission interface for the photography application that meets an authority requirement, thereby avoiding chaos of data transmission and ensuring security of data transmission.

At block 202, the operating system acquires the performance improvement strategy by analyzing the scenario data packet.

The performance improvement strategy refers to a resource allocation strategy for improving the running performance of the running scenario of the above-mentioned photography application that is currently running, examples of which include resource adjustment strategies of CPU, GPU, memory bandwidth, disk, network, and the like. The disclosure is not limited herein.

The performance improvement strategy may be an adjustment strategy for one system resource or multiple resources. The disclosure is not particularly restricted.

The scenario data packet contains a data format identifier. The operating system analyzes the scenario data packet according to a data format indicated by the data format identifier, so as to acquire the performance improvement strategy.

At block 203, the operating system adjusts allocation of system resources for the photography application according to the performance improvement strategy.

In one possible implementation, the system resources include at least one of: CPU resources, GPU resources, memory bandwidth resources, disk resources, network resources, and the like, where the network resources include network resources of a data network of the terminal device, network resources of a wireless fidelity (Wi-Fi) network, and control parameter resources of a Bluetooth module.

When the system resources are at least one of CPU resources, GPU resources, memory bandwidth resources, and disk resources, the operating system can adjust the allocation of the system resources via direct communication with a kernel layer of an operating system space. The direct communication means communicating directly through an abstract application programming interface (API).

When the system resources are network resources, the operating system can adjust the allocation of the system resources via indirect communication with the kernel layer of the operating system space. The indirect communication is conducted by invoking proxy services. For example, a Wi-Fi subsystem or a data network subsystem of the network resources is not running in the same system as the operating system, in this situation, the system resources are accessed indirectly through some proxy manners. In details, the operating system provides a Wi-Fi proxy service to indirectly communicate with the Wi-Fi subsystem by invoking an interface of the proxy service.

According to the implementation of the disclosure, the operating system of the terminal device first receives the scenario data packet of the photography application that is currently running, where the scenario data packet includes the performance improvement strategy for the running scenario determined by the photography application. And then, the operating system acquires the performance improvement strategy by analyzing the scenario data packet. Thereafter, the operating system adjusts the allocation of the system resources for the photography application according to the performance improvement strategy. Since the scenario data packet includes the performance improvement strategy for the running scenario of the photography application and is sent by the photography application that is currently running, the operating system can directly acquire the performance improvement strategy for the current running scenario of the photography application. Consequently, it helps to improve a processing speed of the operating system of the terminal device. As the operating system can adjust the allocation of the system resources for the photography application in real time according to the performance improvement strategy, and optimize performance of the photography application under running in real time, real-time performance of resource optimization of the photography application, which is conducted under control of the terminal device, can be improved.

Example of Shooting Preview Scenario

In one possible implementation, the running scenario is the shooting preview scenario and the performance improvement strategy includes system resources to-be-adjusted and an adjustment amount of the system resources to-be-adjusted. The system resources to-be-adjusted include CPU resources and bandwidth resources. The adjustment amount refers to resource occupancy rate or resource ratio, and is associated with a movement speed of the terminal device.

The adjustment amount includes an adjustment amount of the CPU resources and/or an adjustment amount of the bandwidth resources. As mentioned above, the adjustment amount is associated with the movement speed of the terminal device. For example, the faster the movement speed of the terminal device, the greater the adjustment amount, that is, the greater the resource occupancy rate, vice versa. As the adjustment amount is determined according to the movement speed of the terminal device, in the process of shooting preview, when the terminal device is framing, it is possible to avoid a blurred scenario due to slow loading of preview images. Therefore, preview performance can be improved.

The movement speed of the terminal device can be obtained by an accelerometer or a gyroscope of the terminal device.

According to the implementation, when the running scenario of the photography application that is currently running on the terminal device is the shooting preview scenario, the adjustment amount of the system resources to-be-adjusted acquired by the operating system is associated with the movement speed of the terminal device. As the operating system can directly adjust the photography application according to the system resources to-be-adjusted and the adjustment amount of the system resources to-be-adjusted, the processing speed of the operating system and the preview performance of the shooting preview scenario can be improved.

Example of Shooting Scenario

In one possible implementation, the running scenario is the shooting scenario and the performance improvement strategy includes system resources to-be-adjusted and an adjustment amount of the system resources to-be-adjusted. The system resources to-be-adjusted include CPU resources and GPU resources, and the adjustment amount is associated with a vibration frequency of the terminal device.

The adjustment amount includes an adjustment amount of the CPU resources and an adjustment amount of the GPU resources. The adjustment amount is associated with the vibration frequency of the terminal device. For example, the faster the vibration frequency of the terminal device, the greater the adjustment amount acquired, vice versa. As the adjustment amount is determined according to the vibration frequency of the terminal device, it is possible to avoid a blurred image due to vibration of the terminal device during shooting. Therefore, shooting performance can be improved.

According to the implementation, when the running scenario of the photography application that is currently running of the terminal device is the shooting scenario, the adjustment amount of the system resources to-be-adjusted acquired by the operating system is associated with the vibration frequency of the terminal device. As the operating system can directly adjust the photography application according to the system resources to-be-adjusted and the adjustment amount of the system resources to-be-adjusted, the processing speed of the operating system and the shooting performance of the shooting scenario can be improved.

Once the adjustment of system resource allocation is started, obviously it shall be stopped or canceled at some time point later. As how the adjustment will be canceled, the present disclosure is not particularly limited, and the following depicts two manners. When we refer to the adjustment is "canceled" in the context, it means that the system resource allocation is restored to the state prior to the adjustment.

In one possible implementation, the performance improvement strategy includes a preset duration, which is configured to indicate the maximum time period in which allocation of system resources will be adjusted. Based on this, the method further includes the follows after the operating system adjusts the allocation of the system resources for the photography application according to the performance improvement strategy.

The operating system cancels the adjusting of allocation of system resources for the photography application, when the allocation of system resources has been adjusted for a time period equal to or greater than the preset duration.

The preset duration is associated with the running scenario, where different running scenarios correspond to different preset durations for adjusting system resources.

The operating system cancels the adjusting of allocation of system resources for the photography application, that is, cancels the authority of the data transmission interface and restores to allocation of the system resources for the photography application prior to the adjusting according to the performance improvement strategy.

According to the implementation, when detecting that the system resources have been adjusted for a duration greater than or equal to the preset duration, instead of allowing the photography application to occupy a lot of system resources for a long time, the operating system actively cancels the adjusting of allocation of system resources for the photography application, helping to reduce the power consumption and electric quantity consumption of the terminal device.

In one possible implementation, the method further includes the follows after the operating system adjusts the allocation of the system resources for the photography application according to the performance improvement strategy.

The operating system receives an instruction from the photography application via the data transmission interface.

The operating system cancels, according to the instruction, the adjusting of allocation of system resources for the photography application according to the performance improvement strategy.

The instruction is an instruction message sent to the operating system when the photography application detects that the running scenario is finished, that is, when the photography application detects that the user operates to exit the currently running scenario. The instruction is configured for the operating system to cancel the adjusting of allocation of system resources for the photography application.

According to the implementation, the operating system can cancel, according to the instruction sent by the photography application, the adjusting of allocation of system resources for the photography application according to the performance improvement strategy. Therefore, it is possible to improve time accuracy of the cancellation. Since the photography application is not allowed to occupy a lot of system resources for a long time, it is possible to reduce the power consumption and electric quantity consumption of the terminal device.

Figure 3:
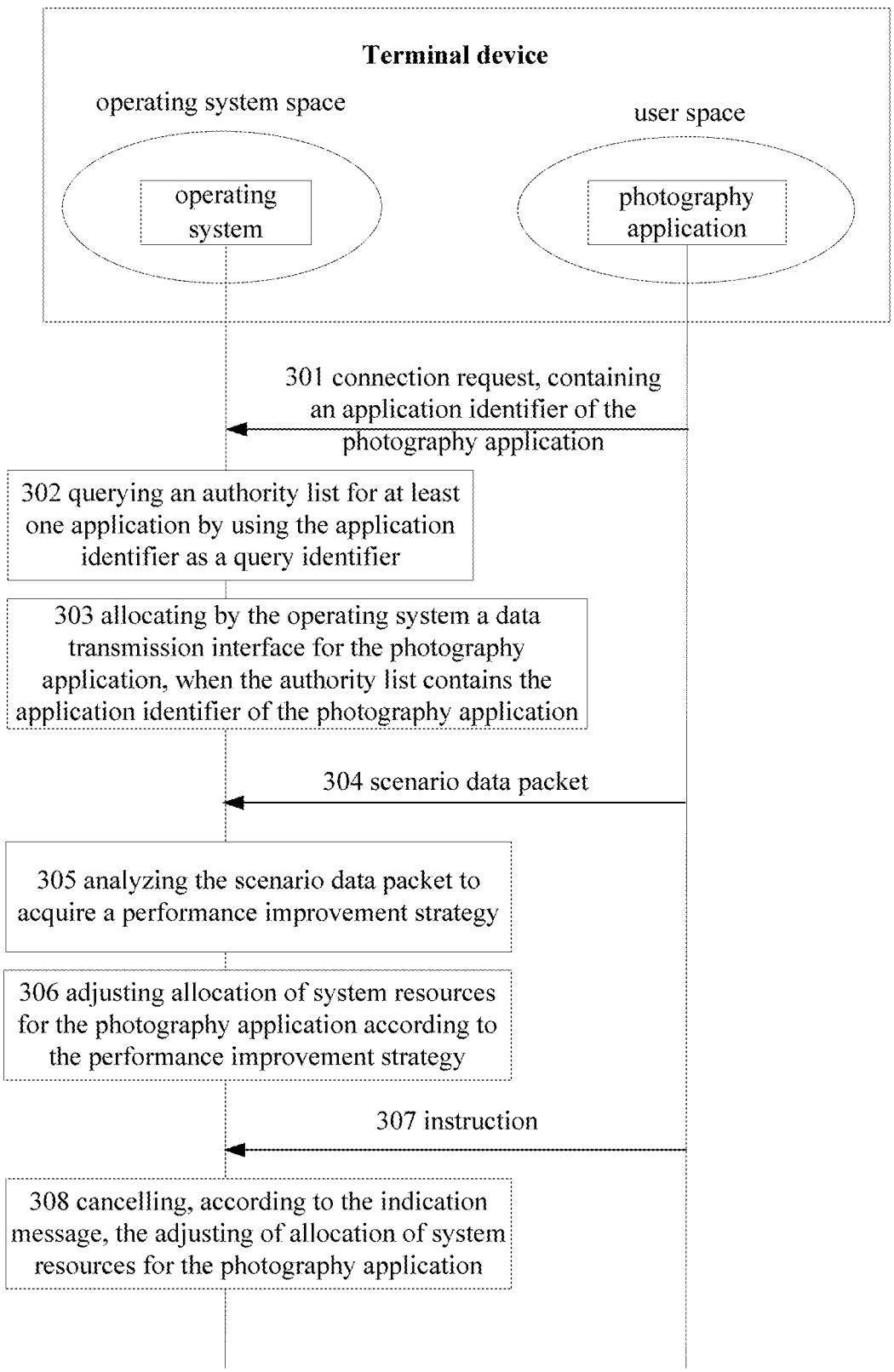
FIG. 3 is a schematic flow chart illustrating a method for resource allocation according to an implementation of the present disclosure.

FIG. 3 is a schematic flow chart illustrating a method for resource allocation according to an implementation of the present disclosure. The method is applicable to a terminal device with an operating system and at least one application. As illustrated in FIG. 3, the method begins at block 301.

At block 301, the operating system receives a connection request from a photography application, where the connection request contains an application identifier of the photography application.

At block 302, the operating system queries an authority list for the at least one application by using the application identifier as a query identifier.

At block 303, the operating system allocates a data transmission interface for the photography application, when the application identifier of the photography application is contained in the authority list.

At block 304, the operating system receives a scenario data packet of the photography application that is currently running.

At block 305, the operating system analyzes the scenario data packet to acquire a performance improvement strategy.

At block 306, the operating system adjusts allocation of system resources for the photography application according to the performance improvement strategy.

At block 307, the operating system receives an instruction from the photography application via the data transmission interface.

At block 308, the operating system cancels, according to the instruction, the adjusting of allocation of system resources for the photography application.

According to the implementation, first the operating system of the terminal device receives the scenario data packet of the photography application that is currently running, where the scenario data packet includes the performance improvement strategy for the running scenario determined by the photography application. Thereafter, the operating system analyzes the scenario data packet to acquire the performance improvement strategy. At last, the operating system adjusts the allocation of the system resources for the photography application according to the performance improvement strategy. As the scenario data packet includes the performance improvement strategy for the running scenario of the photography application and is sent by the photography application that is currently running, the operating system can directly acquire the performance improvement strategy for the currently running scenario of the photography application. As a result, it is beneficial to improving a processing speed of the operating system of the terminal device. Since the operating system can adjust the allocation of the system resources for the photography application in real time according to the performance improvement strategy, the operating system can optimize performance of the photography application under running in real time and real-time performance of resource optimization of the photography application, which is conducted under control of the terminal device, can be improved.

Moreover, when receiving the connection request from the photography application, the operating system first determines an authority of the photography application, and then allocates the data transmission interface for the photography application that meets an authority requirement, rather than blindly allocating the data transmission interface for any application. In this way, chaos of data transmission can be avoided and security of data transmission can be ensured.

In addition, the operating system can cancel, according to the instruction sent by the photography application, the adjusting of allocation of system resources for the photography application according to the performance improvement strategy. Therefore, it is possible to improve time accuracy of the cancellation. Since the photography application is not allowed to occupy a lot of system resources for a long time, the power consumption and electric quantity consumption of the terminal device can be reduced.

Figure 4:
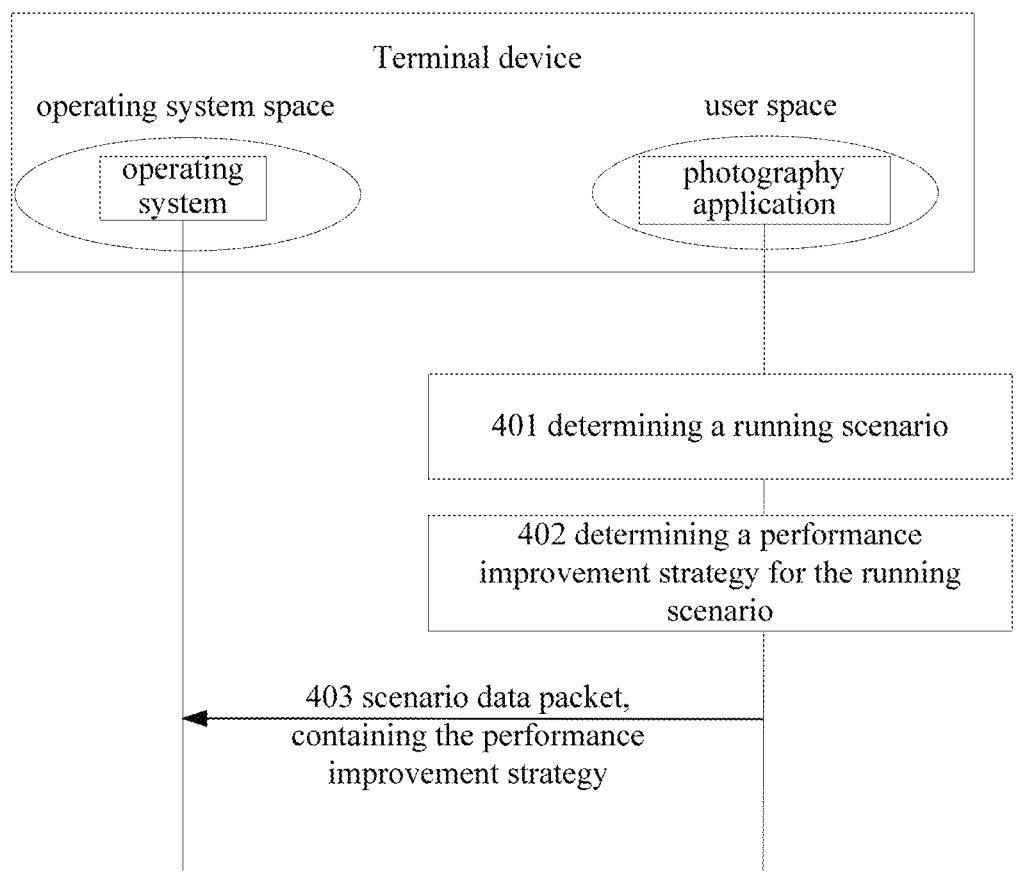
FIG. 4 is a schematic flow chart illustrating a method for resource allocation according to an implementation of the present disclosure.

FIG. 4 is a schematic flow chart illustrating a method for resource allocation according to an implementation of the present disclosure. The method is applicable to a terminal device with an operating system and at least one application. The method can be implemented by a photography application or by a photography application under control of a controller or instructions for example. In this method, the photography application determines a running scenario, determines a performance improvement strategy for the running scenario, and sends a scenario data packet containing the performance improvement strategy to the operating system. As illustrated in FIG. 4, the method begins at block 401.

At block 401, a photography application determines a running scenario.

The photography application determines the running scenario as follows. When detecting an operation request of a user, the photography application queries a plurality of running scenarios stores in the photography application according to the operation request and then determines the running scenario corresponding to the operation request.

The running scenario includes at least one of a shooting preview scenario, a shooting scenario, a continuous shooting scenario, and a filter scenario.

For example, the running scenario is the shooting scenario. In this situation, the operation request can be an action of clicking an instant shooting button of the photography application.

The photography application refers to a third-party application installed in a user space of the terminal device. The third-party application may be installed by a user or pre-installed by developers before the terminal device leaves the factory. The disclosure is not particularly restricted.

The running scenario refers to a current running scenario of the photography application. The running scenario may be classified or divided according to different preset conditions, for example, it may be classified into a shooting preview scenario, a shooting scenario, a continuous shooting scenario, a filter scenario, and the like according to the demand for CPU resources, or classified into a viewing picture scenario, a viewing video scenario, and the like according to the demand for GPU resources. Since different running scenarios are classified or divided according to different demands for system resources, the performance improvement strategy can be quickly determined according to the running scenario. In addition, the preset conditions may be associated with different photography applications, and different photography applications may provide the same or different running scenarios according to the preset conditions. The disclosure will not be particularly restricted.

At block 402, the photography application determines a performance improvement strategy for the running scenario.

The performance improvement strategy refers to a resource allocation strategy for improving the running performance of the running scenario of the above-mentioned photography application that is currently running, for example, resource adjustment strategies of CPU, GPU, memory bandwidth, disk, network, and the like. The disclosure is not limited herein. In addition, the performance improvement strategy may include system resources to-be-adjusted, and an adjustment amount of the system resources to-be-adjusted, or an adjustment duration of the system resources to-be-adjusted.

The photography application pre-stores a mapping relation between multiple running scenarios and multiple performance improvement strategies. The photography application can query the mapping relation between multiple running scenarios and multiple performance improvement strategies by using the running scenario as a query identifier, so as to acquire the performance improvement strategy corresponding to the running scenario. The mapping relation can be set by the developer according to test results when the photography application is shipped from the factory.

At block 403, the photography application sends a scenario data packet to the operating system, where the scenario data packet contains the performance improvement strategy.

The scenario data packet is configured for the operating system to adjust allocation of system resources for the photography application according to the performance improvement strategy.

According to the implementation of the disclosure, the photography application of the terminal device first determines the running scenario; after that, the photography application determines the performance improvement strategy for the running scenario; at last the photography application sends the scenario data packet to the operating system, where the scenario data packet includes the performance improvement strategy and is configured for the operating system to adjust allocation of system resources for the photography application according to the performance improvement strategy. Since the scenario data packet includes the performance improvement strategy for the running scenario of the photography application and is sent by the photography application that is currently running, the operating system can directly acquire the performance improvement strategy for the currently running scenario of the photography application. Consequently, it helps to improve a processing speed of the operating system of the terminal device. As the operating system can adjust the allocation of the system resources for the photography application in real time according to the performance improvement strategy, and optimize performance of the photography application under running in real time, real-time performance of resource optimization of the photography application, which is conducted under control of the terminal device, can be improved.

In one possible implementation, the photography application determines the performance improvement strategy for the running scenario as follows.

The photography application queries a preset mapping relation between running scenarios and system resources by using the running scenario as a query identifier to acquire system resources to-be-adjusted corresponding to the running scenario. The photography application acquires a state parameter of the terminal device. The photography application determines an adjustment amount of the system resources to-be-adjusted according to the state parameter. The photography application determines the performance improvement strategy for the running scenario according to the system resources to-be-adjusted and the adjustment amount of the system resources to-be-adjusted.

The state parameter can include parameters such as a movement speed, a vibration frequency, and the like.

According to the implementation, the photography application can determine the system resources to-be-adjusted according to the running scenario and quickly determine accurate adjustment amount of the system resources to-be-adjusted according to the state parameter of the terminal device. Therefore, it is beneficial to improving a speed and accuracy of the resource allocation.

In one possible implementation, the running scenario is the shooting preview scenario; in this situation, the photography application acquires the performance improvement strategy for the running scenario in the following manner.

The photography application acquires CPU resources and bandwidth resources as system resources to-be-adjusted corresponding to the running scenario, by querying a preset mapping relation between running scenarios and system resources via using the running scenario as a query identifier. The photography application acquires a movement speed of the terminal device. The photography application determines an adjustment amount of the system resources to-be-adjusted according to the movement speed. The photography application determines the performance improvement strategy for the shooting preview scenario according to the system resources to-be-adjusted and the adjustment amount of the system resources to-be-adjusted.

The photography application can acquire the movement speed of the terminal device via an accelerometer or a gyroscope of the terminal device.

The photography application determines the adjustment amount of the system resources to-be-adjusted according to the movement speed in the following manner. By using a numerical interval that the movement speed falls into as a query identifier, query a mapping relation between numerical intervals of a plurality of movement speeds and adjustment amounts of the CPU resources to determine an adjustment amount of CPU resources to-be-adjusted, and query a mapping relation between the numerical intervals of the plurality of movement speeds and adjustment amounts of the bandwidth resources to determine an adjustment amount of bandwidth resources to-be-adjusted.

According to the implementation, the photography application can determine the system resources to-be-adjusted according to the shooting preview scenario and quickly determine accurate adjustment amount of the system resources to-be-adjusted according to the movement speed of the terminal device. Therefore, it is beneficial to improving the speed and the accuracy of the resource allocation.

In one possible implementation, the running scenario is the shooting scenario; in this situation, the photography application acquires the performance improvement strategy for the running scenario in the following manner.

The photography application acquires CPU resources and GPU resources as system resources to-be-adjusted corresponding to the running scenario, by querying a preset mapping relation between running scenarios and system resources via using the running scenario as a query identifier. The photography application acquires a vibration frequency of the terminal device. The photography application determines an adjustment amount of the system resources to-be-adjusted according to the vibration frequency. The photography application determines the performance improvement strategy for the shooting scenario according to the system resources to-be-adjusted and the adjustment amount of the system resources to-be-adjusted.

The photography application determines the adjustment amount of the system resources to-be-adjusted according to the vibration frequency as follows. By using a numerical interval that the vibration frequency falls into as a query identifier, query a mapping relation between numerical intervals of a plurality of vibration frequencies and adjustment amounts of the CPU resources to determine an adjustment amount of CPU resources to-be-adjusted, and query a mapping relation between the numerical intervals of the plurality of vibration frequencies and adjustment amounts of the GPU resources to determine an adjustment amount of GPU resources to-be-adjusted.

According to the implementation, the photography application can determine the system resources to-be-adjusted according to the shooting scenario and quickly determine accurate adjustment amount of the system resources to-be-adjusted according to the vibration frequency of the terminal device. Therefore, it is beneficial to improving the speed and the accuracy of the resource allocation.

In one possible implementation, the method further includes the following before the photography application sends the scenario data packet to the operating system.

The photography application sends a connection request to the operating system, where the connection request contains an application identifier of the photography application. The application identifier is configured for the operating system to query an authority list for the at least one application by using the application identifier as a query identifier. When the application identifier of the photography application is contained in the authority list, the operating system allocates a data transmission interface for the photography application. The data transmission interface is configured for data transmission between the photography application and the operating system, and the data at least includes the scenario data packet.

According to the implementation, the photography application sends the connection request to the operating system to request the operating system to allocate the data transmission interface. Thereafter, instead of blindly allocating the data transmission interface for any application, the operating system allocates the data transmission interface for the photography application that meets an authority requirement after determining an authority of the photography application, thereby avoiding chaos of data transmission and ensuring security of data transmission.

In one possible implementation, the method further includes the following after the photography application sends the scenario data packet to the operating system.

The photography application sends an instruction to the operating system via the data transmission interface, where the instruction is configured for the operating system to cancel, according to the instruction, the adjusting of allocation of system resources for the photography application according to the performance improvement strategy.

The instruction is an instruction sent to the operating system when the running application detects an end of the running scenario, (for example, when the shooting is completed and a corresponding photograph is determined, or the filter process is finished, etc.) or when the running application detects an exit operation of the running application or the photography application.

According to the implementation, the photography application sends the instruction to the operating system when detecting that the running scenario is finished, to indicate the operating system to cancel the adjusting of allocation of system resources for the photography application according to the performance improvement strategy. In this way, time accuracy of cancellation can be improved and the photography application will not occupy a lot of system resources for a long time, reducing the power consumption and electric quantity consumption of the terminal device.

Figure 5:
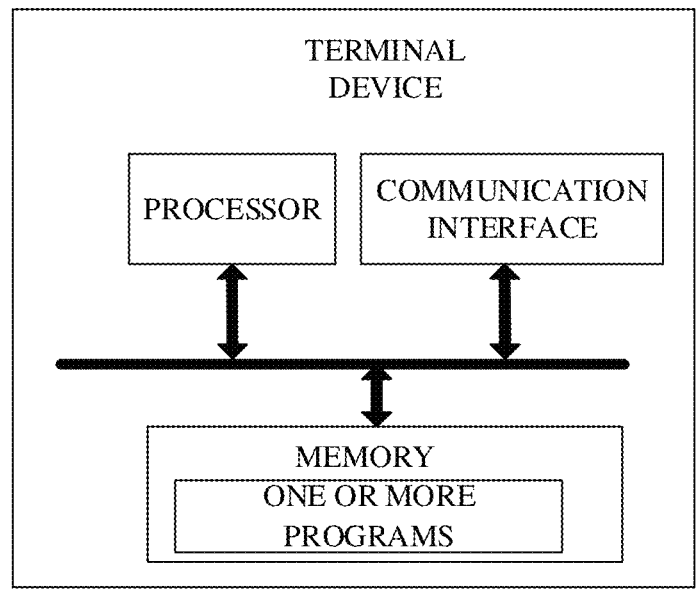
FIG. 5 is a schematic structural diagram illustrating a terminal device according to an implementation of the present disclosure.

FIG. 5 is a schematic structural diagram illustrating a terminal device according to an implementation of the present disclosure. An operating system and at least one application run on the terminal device. The terminal device includes at least one processor and a computer readable storage. For ease of description, a processor and a memory are illustrated in FIG. 5. The terminal device may further include a communication interface. The memory is configured to store one or more programs which are different from the foregoing at least one applications including the photograph application. The one or more programs are configured to be executed by the processor and include instructions operable to execute the following operations.

The operating system receives a scenario data packet of a photography application that is currently running, where the scenario data packet includes a performance improvement strategy determined by the photography application according to a running scenario. The operating system acquires the performance improvement strategy by analyzing the scenario data packet. The operating system adjusts allocation of system resources for the photography application according to the performance improvement strategy. The operating system can carry out these actions under control of the instructions for example.

According to the implementation of the disclosure, the operating system of the terminal device first receives the scenario data packet of the photography application that is currently running, where the scenario data packet includes the performance improvement strategy determined by the photography application according to the running scenario. Then the operating system acquires the performance improvement strategy by analyzing the scenario data packet. Thereafter, the operating system adjusts the allocation of the system resources for the photography application according to the performance improvement strategy. Since the scenario data packet includes the performance improvement strategy for the running scenario of the photography application and is sent by the photography application that is currently running, the operating system can directly acquire the performance improvement strategy for the currently running scenario of the photography application. Consequently, it helps to improve a processing speed of the operating system of the terminal device. As the operating system can adjust the allocation of the system resources for the photography application in real time according to the performance improvement strategy, the operating system can optimize performance of the photography application under running in real time and therefore, real-time performance of resource optimization of the photography application, which is conducted under control of the terminal device, can be improved.

As one implementation, the running scenario can be a shooting preview scenario, a shooting scenario, a continuous shooting scenario, a filter scenario, and the like.

As one implementation, the running scenario is the shooting preview scenario and the performance improvement strategy includes system resources to-be-adjusted and an adjustment amount of the system resources to-be-adjusted. The system resources to-be-adjusted include central processing unit (CPU) resources and bandwidth resources, and the adjustment amount is associated with a movement speed of the terminal device.

As one implementation, the running scenario is the shooting scenario and the performance improvement strategy includes system resources to-be-adjusted and an adjustment amount of the system resources to-be-adjusted. The system resources to-be-adjusted include central processing unit (CPU) resources and graphics processing unit (GPU) resources, and the adjustment amount is associated with a vibration frequency of the terminal device.

As one implementation, the programs further include instructions operable to execute the following operations. Before receiving the scenario data packet of the photography application that is currently running, the operating system receives a connection request from the photography application, where the connection request contains an application identifier of the photography application. The operating system queries an authority list for the at least one application by using the application identifier as a query identifier. The operating system allocates a data transmission interface for the photography application, when the application identifier of the photography application is contained in the authority list, where the data transmission interface is configured to transmit data between the photography application and the operating system, and the data at least includes the scenario data packet.

As one implementation, the performance improvement strategy includes a preset duration. The programs further include instructions operable to execute the following operations. After adjusting the allocation of the system resources for the photography application according to the performance improvement strategy, the operating system cancels the adjusting of allocation of system resources for the photography application according to the performance improvement strategy, when the time period in which the allocation of system resources has been adjusted reaches the preset duration.

As one implementation, the programs further include instructions operable to execute the following operations. After adjusting the allocation of the system resources for the photography application according to the performance improvement strategy, the operating system receives an instruction from the photography application via the data transmission interface. The operating system cancels, according to the instruction, the adjusting of allocation of system resources for the photography application according to the performance improvement strategy.

Alternatively, the programs include instructions operable to execute the following operations.

A photography application determines a running scenario.

The photography application acquires a performance improvement strategy for the running scenario.

The photography application sends a scenario data packet to the operating system, where the scenario data packet includes the performance improvement strategy and is configured for the operating system to adjust allocation of system resources for the photography application according to the performance improvement strategy.

According to the implementation of the disclosure, the photography application of the terminal device first determines the running scenario; after that, the photography application acquires the performance improvement strategy for the running scenario; then the photography application sends the scenario data packet to the operating system, where the scenario data packet includes the performance improvement strategy and is configured to adjust allocation of system resources for the photography application according to the performance improvement strategy by the operating system. Since the scenario data packet includes the performance improvement strategy for the running scenario of the photography application and is sent by the photography application that is currently running, the operating system can directly acquire the performance improvement strategy for the currently running scenario of the photography application. Consequently, it helps to improve the processing speed of the operating system of the terminal device. As the operating system can adjust the allocation of the system resources for the photography application in real time according to the performance improvement strategy and can optimize performance of the photography application under running in real time, real-time performance of resource optimization of the photography application, which is conducted under control of the terminal device, can be improved.

As one implementation, the running scenario includes at least one of a shooting preview scenario, a shooting scenario, a continuous shooting scenario, and a filter scenario.

As one implementation, in terms of acquiring the performance improvement strategy for the running scenario, the instructions of the programs are configured to execute the following operations. The photography application acquires system resources to-be-adjusted corresponding to the running scenario, by querying a preset mapping relation between running scenarios and system resources via using the running scenario as a query identifier. The photography application acquires a state parameter of the terminal device. The photography application determines an adjustment amount of the system resources to-be-adjusted according to the state parameter. The photography application determines the performance improvement strategy for the running scenario according to the system resources to-be-adjusted and the adjustment amount of the system resources to-be-adjusted.

As one implementation, the running scenario is the shooting preview scenario. The instructions of the programs operable to cause the photography application to acquire the performance improvement strategy for the running scenario are operable to execute the following operations. The photography application acquires CPU resources and bandwidth resources as system resources to-be-adjusted corresponding to the running scenario, by querying a preset mapping relation between running scenarios and system resources via using the running scenario as a query identifier. The photography application acquires a movement speed of the terminal device. The photography application determines an adjustment amount of the system resources to-be-adjusted according to the movement speed. The photography application determines the performance improvement strategy for the shooting preview scenario according to the system resources to-be-adjusted and the adjustment amount of the system resources to-be-adjusted.

As one implementation, the instructions of the programs operable to cause the photography application to determine the adjustment amount of the system resources to-be-adjusted according to the movement speed are operable to execute the following operations. The photography application determines an adjustment amount of CPU resources to-be-adjusted by querying a mapping relation between numerical intervals of a plurality of movement speeds and adjustment amounts of the CPU resources via using a numerical interval that the movement speed falls into as a query identifier and determines an adjustment amount of bandwidth resources to-be-adjusted by querying a mapping relation between the numerical intervals of the plurality of movement speeds and adjustment amounts of the bandwidth resources via using the numerical interval that the movement speed falls into as the query identifier.

As one implementation, the running scenario is the shooting scenario. The instructions of the programs operable to cause the photography application to acquire the performance improvement strategy for the running scenario are operable to execute the following operations. The photography application acquires CPU resources and GPU resources as system resources to-be-adjusted corresponding to the running scenario, by querying a preset mapping relation between running scenarios and system resources via using the running scenario as a query identifier. The photography application acquires a vibration frequency of the terminal device. The photography application determines an adjustment amount of the system resources to-be-adjusted according to the vibration frequency. The photography application determines the performance improvement strategy for the shooting scenario according to the system resources to-be-adjusted and the adjustment amount of the system resources to-be-adjusted.

As one implementation, the instructions of the programs operable to cause the photography application to determine the adjustment amount of the system resources to-be-adjusted according to the vibration frequency are operable to execute the following operations. The photography application determines an adjustment amount of CPU resources to-be-adjusted by querying a mapping relation between numerical intervals of a plurality of vibration frequencies and adjustment amounts of the CPU resources via using a numerical interval that the vibration frequency falls into as a query identifier, and determines an adjustment amount of GPU resources to-be-adjusted by querying a mapping relation between the numerical intervals of the plurality of vibration frequencies and adjustment amounts of the GPU resources via using the numerical interval that the vibration frequency falls into as the query identifier.

As one implementation, the programs further include instructions operable to execute the following operations. Before sending the scenario data packet to the operating system, the photography application sends a connection request to the operating system, where the connection request contains an application identifier of the photography application. The application identifier is configured for the operating system to query an authority list for the at least one application by using the application identifier as a query identifier. When the application identifier of the photography application is contained in the authority list, the operating system allocates a data transmission interface for the photography application. The data transmission interface is configured to transmit data between the photography application and the operating system, and the data at least includes the scenario data packet.

As one implementation, the programs further include instructions operable to execute the following operations. After sending the scenario data packet to the operating system, the photography application sends an instruction to the operating system via the data transmission interface. The instruction is configured to indicate the operating system to cancel, according to the instruction, the adjusting of allocation of system resources for the photography application according to the performance improvement strategy.

The foregoing solution of the implementations of the disclosure is mainly described from the viewpoint of execution process of the method. It can be understood that, in order to implement the above functions, the terminal device may include hardware structures and/or software modules corresponding to the respective functions. Those skilled in the art should readily recognize that, in combination with the example units and scheme steps or operations described in the implementations disclosed herein, the present disclosure can be implemented in hardware or a combination of the hardware and computer software. Whether a function is implemented by way of the hardware or hardware driven by the computer software depends on the particular application and design constraints of the technical solution. Those skilled in the art may use different methods to implement the described functions for each particular application, but such implementation should not be considered as beyond the scope of the present disclosure.

According to the implementations of the disclosure, functional units may be divided for the terminal device in accordance with the foregoing method examples. For example, each functional unit may be divided per each function, and two or more functions may be integrated in one processing unit. The above-mentioned integrated unit can be implemented in the form of hardware or software functional units. It should be noted that the division of units in the implementations of the present disclosure is schematic and is merely a logical function division, and there may be other division manners in actual implementation.

Figure 6:
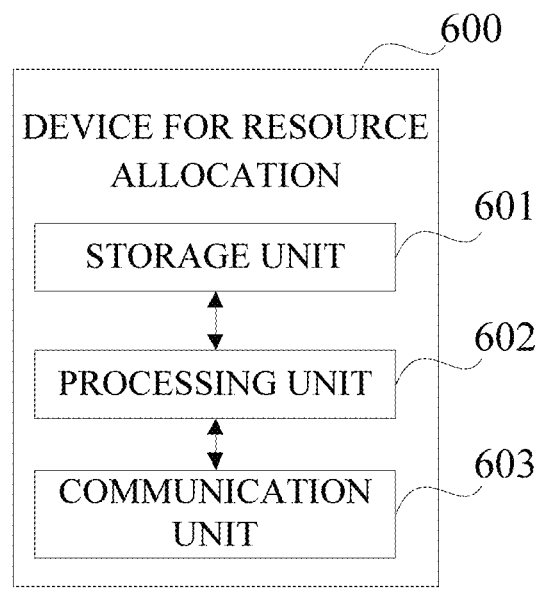
FIG. 6 is a block diagram illustrating functional units of a terminal device according to an implementation of the present disclosure.

In the case of integrated units, FIG. 6 is a block diagram illustrating possible functional units of a device for resource allocation involved in the above implementations. The device 600 is applicable to a terminal device with an operating system and at least one application. The device 600 includes a processing unit 602 and a communication unit 603. The processing unit 602 is configured to control and manage the operations of the device 600. For example, the processing unit 602 is configured to support the device 600 to execute the operations at block 201-block 203 in FIG. 2, the operations at block 301-block 308 in FIG. 3, or the operations at block 401-block 403 in FIG. 4, and/or other operations of the technology described in the context. The device 600 can further include a storage unit 601. The storage unit 601 is configured to store program codes and data.

The processing unit 602 is configured to: control the operating system to receive a scenario data packet of a photography application that is currently running through the communication unit 603, where the scenario data packet includes a performance improvement strategy determined by the photography application according to a running scenario, control the operating system to analyze the scenario data packet to acquire the performance improvement strategy, and control the operating system to adjust allocation of system resources for the photography application according to the performance improvement strategy.

As one implementation, the running scenario includes at least one of a shooting preview scenario, a shooting scenario, a continuous shooting scenario, and a filter scenario.

As one implementation, the running scenario is the shooting preview scenario and the performance improvement strategy includes system resources to-be-adjusted and an adjustment amount of the system resources to-be-adjusted. The system resources to-be-adjusted include CPU resources and bandwidth resources, and the adjustment amount is associated with a movement speed of the terminal device.

As one implementation, the running scenario is the shooting scenario and the performance improvement strategy includes system resources to-be-adjusted and an adjustment amount of the system resources to-be-adjusted. The system resources to-be-adjusted include CPU resources and GPU resources, and the adjustment amount is associated with a vibration frequency of the terminal device.

As one implementation, before controlling the operating system to receive the scenario data packet of the photography application that is currently running through the communication unit 603, the processing unit 602 is further configured to: control the operating system to receive a connection request from the photography application through the communication unit 603, where the connection request contains an application identifier of the photography application, control the operating system to query an authority list for the at least one application by using the application identifier as a query identifier, and control the operating system to allocate a data transmission interface for the photography application, when the application identifier of the photography application is contained in the authority list, where the data transmission interface is configured to transmit data between the photography application and the operating system, and the data at least includes the scenario data packet.

As one implementation, the performance improvement strategy includes a preset duration. After controlling the operating system to adjust the allocation of the system resources for the photography application according to the performance improvement strategy, the processing unit 602 is further configured to control the operating system to cancel the adjusting of allocation of system resources for the photography application according to the performance improvement strategy, when the time period in which the allocation of system resources has been adjusted reaches the preset duration.

As one implementation, after controlling the operating system to adjust the allocation of the system resources for the photography application according to the performance improvement strategy, the processing unit 602 is further configured to: control the operating system to receive an instruction from the photography application via the data transmission interface, and control the operating system to cancel, according to the instruction, the adjusting of allocation of system resources for the photography application according to the performance improvement strategy.

Alternatively, the processing unit 602 is configured to: control a photography application to determine a running scenario, control the photography application to acquire a performance improvement strategy for the running scenario, and control the photography application to send a scenario data packet to the operating system through the communication unit 603, where the scenario data packet includes the performance improvement strategy and is configured for the operating system to adjust allocation of system resources for the photography application according to the performance improvement strategy.

As one implementation, the running scenario includes at least one of a shooting preview scenario, a shooting scenario, a continuous shooting scenario, and a filter scenario.

As one implementation, the processing unit 602 configured to control the photography application to acquire the performance improvement strategy for the running scenario is configured to: control the photography application to acquire system resources to-be-adjusted corresponding to the running scenario by querying a preset mapping relation between running scenarios and system resources via using the running scenario as a query identifier, control the photography application to acquire a state parameter of the terminal device, control the photography application to determine an adjustment amount of the system resources to-be-adjusted according to the state parameter, and control the photography application to determine the performance improvement strategy for the running scenario according to the system resources to-be-adjusted and the adjustment amount of the system resources to-be-adjusted.

As one implementation, the running scenario is the shooting preview scenario. In terms of controlling the photography application to acquire the performance improvement strategy for the running scenario, the processing unit 602 is configured to: control the photography application to acquire CPU resources and bandwidth resources as system resources to-be-adjusted corresponding to the running scenario, by querying a preset mapping relation between running scenarios and system resources via using the running scenario as a query identifier, control the photography application to acquire a movement speed of the terminal device, control the photography application to determine an adjustment amount of the system resources to-be-adjusted according to the movement speed, and control the photography application to determine the performance improvement strategy for the shooting preview scenario according to the system resources to-be-adjusted and the adjustment amount of the system resources to-be-adjusted.

As one implementation, the running scenario is the shooting scenario. The processing unit 602 configured to control the photography application to acquire the performance improvement strategy for the running scenario is configured to: control the photography application to acquire CPU resources and GPU resources as system resources to-be-adjusted corresponding to the running scenario by querying a preset mapping relation between running scenarios and system resources via using the running scenario as a query identifier, control the photography application to acquire a vibration frequency of the terminal device, control the photography application to determine an adjustment amount of the system resources to-be-adjusted according to the vibration frequency, and control the photography application to determine the performance improvement strategy for the shooting scenario according to the system resources to-be-adjusted and the adjustment amount of the system resources to-be-adjusted.

As one implementation, before controlling the photography application to send the scenario data packet to the operating system, the processing unit 602 is further configured to: control the photography application to send a connection request to the operating system through the communication unit 603, where the connection request contains an application identifier of the photography application. The application identifier is configured for the operating system to query an authority list for the at least one application by using the application identifier as a query identifier. When the application identifier of the photography application is contained in the authority list, the operating system is controlled to allocate a data transmission interface for the photography application, where the data transmission interface is configured to transmit data between the photography application and the operating system, and the data at least includes the scenario data packet.

As one implementation, after controlling the photography application to send the scenario data packet to the operating system, the processing unit 602 is further configured to control the photography application to send an instruction to the operating system via the data transmission interface, where the instruction is configured to cancel, according to the instruction, the adjusting of allocation of system resources for the photography application according to the performance improvement strategy by the operating system.

The processing unit 602 can be a processor or a controller. The communication unit 603 can be an internal communication interface between a processor and a program space, for example, a communication interface between the processor and an operating system space, or a communication interface between the processor and a user space. The storage unit 601 can be a memory.

Figure 7:
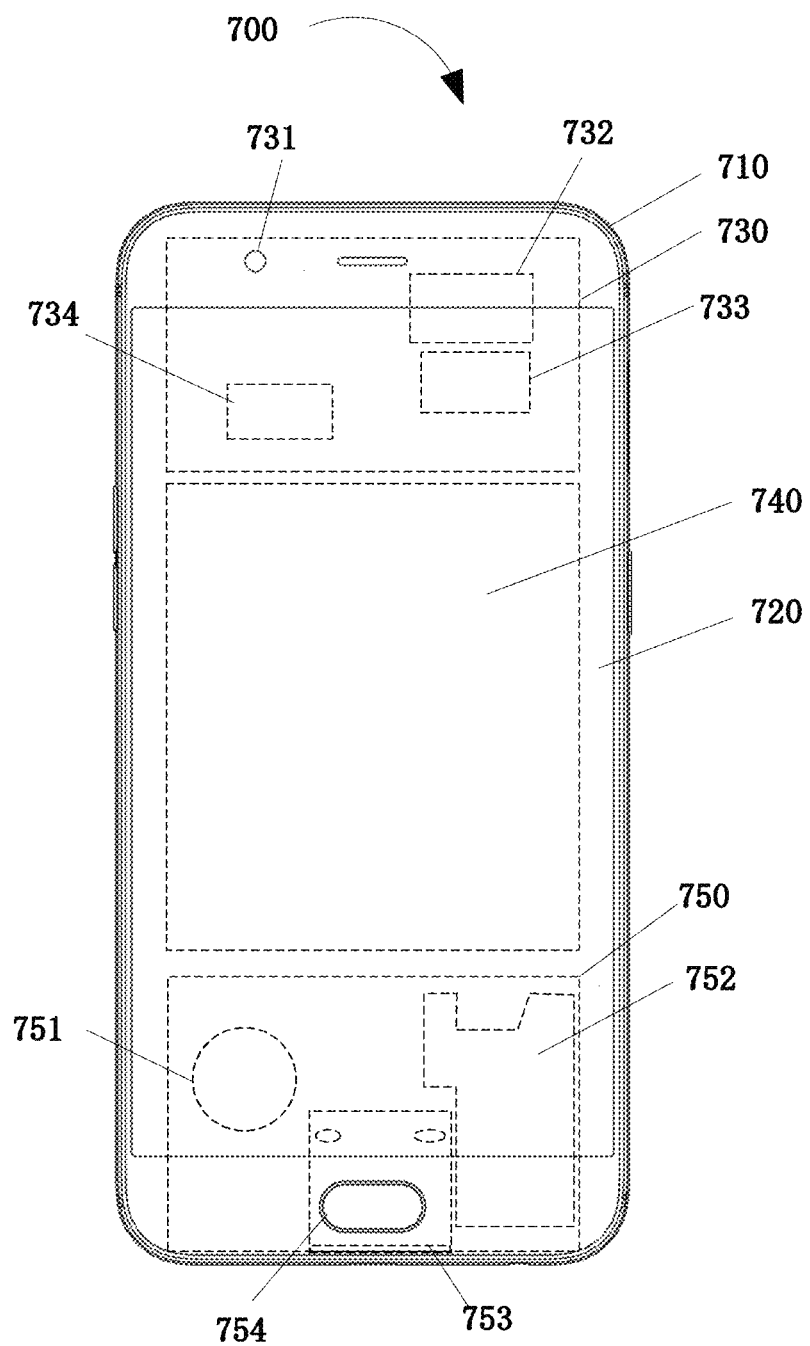
FIG. 7 is a schematic structural diagram illustrating a smart phone according to an implementation of the present disclosure.

FIG. 7 is a schematic structural diagram illustrating a smart phone 700 according to an implementation of the present disclosure. The smart phone 700 includes a housing 710, a touch screen 720, a main board 730, a battery 740, and a sub-board 750. The main board 730 is provided with a front camera 731, a processor 732, a memory 733, a power management chip 734, and the like. The sub-board 750 is provided with a vibrator 751, an integrated audio cavity 752, a VOOC flash charging interface 753, and a fingerprint recognition module 754.

The smart phone has a photography application and an operating system. The photography application runs on a user space and the operating system runs on an operating system space. The operating system is configured to receive a scenario data packet of the photography application that is currently running, where the scenario data packet includes a performance improvement strategy determined by the photography application according to a running scenario. The operating system is configured to acquire the performance improvement strategy by analyzing the scenario data packet. The operating system is further configured to adjust allocation of system resources for the photography application according to the performance improvement strategy.

The photography application is configured to determine a running scenario. The photography application is configured to acquire a performance improvement strategy for the running scenario. The photography application is configured to send a scenario data packet to the operating system, where the scenario data packet includes the performance improvement strategy and is configured for the operating system to adjust allocation of system resources for the photography application according to the performance improvement strategy.

The processor 732 is the control center of the smart phone and is configured to connect various parts of the whole smart phone through various interfaces and lines, run or execute software programs and/or modules stored in the memory 733, and invoke data stored in the memory 733 to perform various functions of the mobile phone and process data, thereby monitoring the mobile phone as a whole. In at least one implementation, the processor 732 may include one or more processing units. For example, the processor 732 may integrate an application processor and a modem processor, where the application processor is configured to handle the operating system, the user interface, the application, and so on, and the modem processor is mainly configured to process wireless communication. It will be understood that the above-mentioned modem processor may not be integrated into the processor 732. The processor 732 may be, for example, a central processing unit (CPU), a general-purpose processor, a digital signal processor (DSP), an application specific integrated circuit (ASIC), a field programmable gate array (FPGA), or other programmable logic devices, transistor logic devices, hardware components, or any combination thereof. Various example logical blocks, modules, and circuits described in conjunction with the disclosure may be achieved or implemented. The processor may also be a combination of computing functions, for example, a combination of one or more microprocessors, a combination of the DSP and the microprocessor, and the like.

The memory 733 is configured to store software programs and modules, and the processor 732 is configured to execute various function applications and data processing of the mobile phone by running the software programs and the modules stored in the memory 733. The memory 733 mainly includes a program storage area and a data storage area. The program storage area may store an operating system, applications required for at least one function, and so on. The data storage area may store data created according to use of the smart phone, and so on. In addition, the memory 733 may include a high-speed RAM, and may further include a non-transitory memory such as at least one disk storage device, a flash device, or other non-transitory solid storage devices. The memory 733 may be, for example, a random access memory (RAM), a flash memory, a read only memory (ROM), an erasable programmable ROM (EPROM), an electrically EPROM (EEPROM), a register, a hard disk, a mobile hard disk, a compact disc-read only memory (CD-ROM), or any other form of storage medium known in the art.

Implementations further provide a non-transitory computer readable storage medium. The non-transitory computer readable storage medium stores computer programs for electronic data interchange which, when executed by a processor, are operable with the processor to execute all or part of the operations of any of the methods described in the above-described method implementations.

Implementations of the present disclosure also provide a computer readable storage medium. The computer readable storage medium stores computer programs for electronic data interchange which, when executed, are operable with a computer to execute all or part of the operations of any of the methods described in the above-described method implementations. The computer may include a terminal device.

Implementations of the present disclosure also provide a computer program product. The computer program product includes a non-transitory computer readable storage medium that stores computer programs. The computer programs are operable with a computer to perform all or part of the operations of any of the methods described in the above method implementations. The computer program product may be a software installation package and the computer may include a terminal device.

It is to be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are examples and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be an electrical connection, mechanical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory includes various medium capable of storing program codes, such as a USB (universal serial bus) flash disk, a read-only memory (ROM), a random-access memory (RAM), a removable hard disk, Disk, compact disc (CD), or the like.

It will be understood by those of ordinary skill in the art that all or a part of the various methods of the implementations described above may be accomplished by means of a program to instruct associated hardware, the program may be stored in a computer readable memory, which may include a flash memory, a read-only memory (ROM), a random-access memory (RAM), Disk or compact disc (CD), and so on.

While the present disclosure has been described in detail above with reference to the example implementations, the scope of the present disclosure is not limited thereto. As will occur to those skilled in the art, the present disclosure is susceptible to various modifications and changes without departing from the spirit and principle of the present disclosure. Therefore, the scope of the present disclosure should be determined by the scope of the claims.

What is claimed is:

1. A method for resource allocation, comprising:
   determining, by a photography application of a terminal device, a running scenario;
   determining, by the photography application, a performance improvement strategy for the running scenario;
   sending, by the photography application, a scenario data packet to an operating system of the terminal device, wherein the scenario data packet comprises the performance improvement strategy, wherein the performance improvement strategy is used for the operating system to adjust allocation of system resources for the photography application; and
   sending, by the photography application, an instruction to the operating system via a data transmission interface, wherein the instruction is configured for the operating system to cancel, according to the instruction, the adjusting of allocation of system resources for the photography application according to the performance improvement strategy.

2. The method of claim 1, wherein the running scenario comprises at least one of a shooting preview scenario, a shooting scenario, a continuous shooting scenario, or a filter scenario.

3. The method of claim 1, wherein the running scenario is a shooting preview scenario and determining, by the photography application, the performance improvement strategy for the running scenario comprises:
   acquiring, by the photography application, central processing unit (CPU) resources and bandwidth resources as system resources to-be-adjusted corresponding to the running scenario, by querying a preset mapping relation between running scenarios and system resources with the running scenario as a query identifier;
   acquiring, by the photography application, a movement speed of the terminal device;
   determining, by the photography application, an adjustment amount of the system resources to-be-adjusted according to the movement speed; and
   determining, by the photography application, the performance improvement strategy for the shooting preview scenario according to the system resources to-be-adjusted and the adjustment amount of the system resources to-be-adjusted.

4. The method of claim 3, wherein determining, by the photography application, the adjustment amount of the system resources to-be-adjusted according to the movement speed comprises:
   determining, by the photography application, an adjustment amount of CPU resources to-be-adjusted by querying a mapping relation between numerical intervals of a plurality of movement speeds and adjustment amounts of the CPU resources with a numerical interval that the movement speed falls into as another query identifier; and
   determining, by the photography application, an adjustment amount of bandwidth resources to-be-adjusted by querying a mapping relation between the numerical intervals of the plurality of movement speeds and adjustment amounts of the bandwidth resources with the numerical interval that the movement speed falls into as the query identifier.

5. The method of claim 1, wherein the running scenario is a shooting scenario, and determining, by the photography application, the performance improvement strategy for the running scenario comprises:

acquiring, by the photography application, CPU resources and graphics processing unit (GPU) resources as system resources to-be-adjusted corresponding to the running scenario, by querying a preset mapping relation between running scenarios and system resources with the running scenario as a query identifier;

acquiring, by the photography application, a vibration frequency of the terminal device;

determining, by the photography application, an adjustment amount of the system resources to-be-adjusted according to the vibration frequency; and determining, by the photography application, the performance improvement strategy for the shooting scenario according to the system resources to-be-adjusted and the adjustment amount of the system resources to-be-adjusted.

6. The method of claim 5, wherein determining, by the photography application, the adjustment amount of the system resources to-be-adjusted according to the vibration frequency comprises:

determining, by the photography application, an adjustment amount of CPU resources to-be-adjusted by querying a mapping relation between numerical intervals of a plurality of vibration frequencies and adjustment amounts of the CPU resources with a numerical interval that the vibration frequency falls into as another query identifier; and determining, by the photography application, an adjustment amount of GPU resources to-be-adjusted by querying a mapping relation between the numerical intervals of the plurality of vibration frequencies and adjustment amounts of the GPU resources with the numerical interval that the vibration frequency falls into as the query identifier.

7. The method of claim 1, wherein determining, by the photography application, the performance improvement strategy for the running scenario comprises:

acquiring, by the photography application, system resources to-be-adjusted corresponding to the running scenario, by querying a preset mapping relation between running scenarios and system resources with the running scenario as a query identifier;

acquiring, by the photography application, a state parameter of the terminal device;

determining, by the photography application, an adjustment amount of the system resources to-be-adjusted according to the state parameter; and determining, by the photography application, the performance improvement strategy for the running scenario according to the system resources to-be-adjusted and the adjustment amount of the system resources to-be-adjusted.

8. The method of claim 1, further comprising:

sending, by the photography application, a connection request to the operating system, to request the operating system to allocate a data transmission interface for the photography application, wherein the data transmission interface is configured for data transmission between the photography application and the operating system, wherein the connection request contains an application identifier of the photography application, the application identifier is configured for the operating system to query an authority list of the terminal device for at least one application by using the application identifier as a query identifier, and the data transmission interface is allocated when the application identifier of the photography application is contained in the authority list.

9. A terminal device, comprising:
at least one processor; and
a computer readable storage, coupled to the at least one processor and storing at least one computer executable instruction thereon which, when executed by the at least one processor, cause the at least one processor to:

determine, with a photography application of the terminal device, a running scenario;

determine, with the photography application, a performance improvement strategy for the running scenario;

send, with the photography application, a scenario data packet to an operating system of the terminal device, wherein the scenario data packet comprises the performance improvement strategy and is configured for the operating system to adjust allocation of system resources for the photography application according to the performance improvement strategy;

send, with the photography application, a connection request to the operating system, to request the operating system to allocate a data transmission interface for the photography application, wherein the data transmission interface is configured for data transmission between the photography application and the operating system, wherein the connection request contains an application identifier of the photography application, the application identifier is configured for the operating system to query an authority list of the terminal device for at least one application by using the application identifier as a query identifier, and the data transmission interface is allocated when the application identifier of the photography application is contained in the authority list.

10. The terminal device of claim 9, wherein the running scenario is a shooting preview scenario, and the at least one computer executable instruction to determine the performance improvement strategy for the running scenario further causes the at least one processor to:

acquire, with the photography application, central processing unit (CPU) resources and bandwidth resources as system resources to-be-adjusted corresponding to the running scenario, by querying a preset mapping relation between running scenarios and system resources with the running scenario as a query identifier;

acquire, with the photography application, a movement speed of the terminal device;

determine, with the photography application, an adjustment amount of the system resources to-be-adjusted according to the movement speed; and determine, with the photography application, the performance improvement strategy for the shooting preview scenario according to the system resources to-be-adjusted and the adjustment amount of the system resources to-be-adjusted.

11. The terminal device of claim 10, wherein the at least one computer executable instruction to determine the adjustment amount of the system resources to-be-adjusted according to the movement speed further causes the at least one processor to:

determine, with the photography application, an adjustment amount of CPU resources to-be-adjusted by querying a mapping relation between numerical intervals of a plurality of movement speeds and adjustment amounts of the CPU resources with a numerical interval that the movement speed falls into as another query identifier; and determine, with the photography application, an adjustment amount of bandwidth resources to-be-adjusted by querying a mapping relation between the numerical intervals of the plurality of movement speeds and adjustment amounts of the bandwidth resources with the numerical interval that the movement speed falls into as the query identifier.

12. The terminal device of claim 9, wherein the running scenario is a shooting scenario, and the at least one computer executable instruction to determine the performance improvement strategy for the running scenario further causes the at least one processor to:

acquire, with the photography application, CPU resources and graphics processing unit (GPU) resources as system resources to-be-adjusted corresponding to the running scenario, by querying a preset mapping relation between running scenarios and system resources with the running scenario as a query identifier;

acquire, with the photography application, a vibration frequency of the terminal device;

determine, with the photography application, an adjustment amount of the system resources to-be-adjusted according to the vibration frequency; and determine, with the photography application, the performance improvement strategy for the shooting scenario according to the system resources to-be-adjusted and the adjustment amount of the system resources to-be-adjusted.

13. The terminal device of claim 12, wherein the at least one computer executable instruction to determine the adjustment amount of the system resources to-be-adjusted according to the vibration frequency further causes the at least one processor to:

determine, with the photography application, an adjustment amount of CPU resources to-be-adjusted by querying a mapping relation between numerical intervals of a plurality of vibration frequencies and adjustment amounts of the CPU resources with a numerical interval that the vibration frequency falls into as another query identifier; and determine, with the photography application, an adjustment amount of GPU resources to-be-adjusted by querying a mapping relation between the numerical intervals of the plurality of vibration frequencies and adjustment amounts of the GPU resources with the numerical interval that the vibration frequency falls into as the query identifier.

14. The terminal device of claim 9, wherein the at least one computer executable instruction to determine the performance improvement strategy for the running scenario further causes the at least one processor to:

acquire, with the photography application, system resources to-be-adjusted corresponding to the running scenario, by querying a preset mapping relation between running scenarios and system resources with the running scenario as a query identifier;

acquire, with the photography application, a state parameter of the terminal device;

determine, with the photography application, an adjustment amount of the system resources to-be-adjusted according to the state parameter; and determine, with the photography application, the performance improvement strategy for the running scenario according to the system resources to-be-adjusted and the adjustment amount of the system resources to-be-adjusted.

15. The terminal device of claim 9, wherein the at least one computer executable instruction further causes the at least one processor to:

send, with the photography application, an instruction to the operating system via a data transmission interface, wherein the instruction is configured for the operating system to cancel, according to the instruction, the adjusting of allocation of system resources for the photography application according to the performance improvement strategy.

16. A non-transitory computer readable storage medium configured to store computer programs which, when executed by a processor, are operable with the processor to:

determine, with a photography application of a terminal device, a running scenario;

determine, with the photography application, a performance improvement strategy for the running scenario; and send, with the photography application, a scenario data packet to an operating system of the terminal device, wherein the scenario data packet comprises the performance improvement strategy and is configured for the operating system to adjust allocation of system resources for the photography application according to the performance improvement strategy, wherein the computer programs operable with the processor to determine, by the photography application, the performance improvement strategy for the running scenario are operable with the processor to:

acquire, with the photography application, system resources to-be-adjusted corresponding to the running scenario, by querying a preset mapping relation between running scenarios and system resources with the running scenario as a query identifier;

acquire, with the photography application, a state parameter of the terminal device;

determine, with the photography application, an adjustment amount of the system resources to-be-adjusted according to the state parameter; and determine, with the photography application, the performance improvement strategy for the running scenario according to the system resources to-be-adjusted and the adjustment amount of the system resources to-be-adjusted.

17. The non-transitory computer readable storage medium of claim 16, wherein the running scenario is a shooting preview scenario, and the computer programs operable with the processor to determine the performance improvement strategy for the running scenario are operable with the processor to:

acquire, with the photography application, central processing unit (CPU) resources and bandwidth resources as system resources to-be-adjusted corresponding to the running scenario, by querying a preset mapping relation between running scenarios and system resources with the running scenario as a query identifier;

acquire, with the photography application, a movement speed of the terminal device;

determine, with the photography application, an adjustment amount of the system resources to-be-adjusted according to the movement speed; and determine, with the photography application, the performance improvement strategy for the shooting preview scenario according to the system resources to-be-adjusted and the adjustment amount of the system resources to-be-adjusted.

18. The non-transitory computer readable storage medium of claim 16, wherein the running scenario is a shooting scenario, and the computer programs operable with the processor to determine the performance improvement strategy for the running scenario are operable with the processor to:
- acquire, with the photography application, CPU resources and graphics processing unit (GPU) resources as system resources to-be-adjusted corresponding to the running scenario, by querying a preset mapping relation between running scenarios and system resources with the running scenario as a query identifier;
- acquire, with the photography application, a vibration frequency of the terminal device;
- determine, with the photography application, an adjustment amount of the system resources to-be-adjusted according to the vibration frequency; and
- determine, with the photography application, the performance improvement strategy for the shooting scenario according to the system resources to-be-adjusted and the adjustment amount of the system resources to-be-adjusted.

* * * * *